United States Patent [19]

Allahverdian

[11] Patent Number: 4,553,325
[45] Date of Patent: Nov. 19, 1985

[54] CAKE CUTTER WITH AN ADJUSTABLE BLADE

[76] Inventor: Edward Allahverdian, 426 Wing St., Ste. 3, Glendale, Calif. 91705

[21] Appl. No.: 612,575

[22] Filed: May 21, 1984

[51] Int. Cl.[4] ............................................. A21C 15/04
[52] U.S. Cl. .................................... 30/114; 30/296 A; 30/320
[58] Field of Search ...................... 30/114, 115, 296 R, 30/296 A, 279 R, 320, 303, 178

[56] References Cited

U.S. PATENT DOCUMENTS

| | | | |
|---|---|---|---|
| 2,679,687 | 6/1954 | Leobetter | 30/114 |
| 2,841,868 | 7/1958 | O'Brien | 30/114 |
| 4,005,525 | 2/1977 | Gringer | 30/320 X |
| 4,411,066 | 10/1983 | Allahverdian | 30/114 |

FOREIGN PATENT DOCUMENTS 110997 11/1917 United Kingdom ............. 30/296 A

Primary Examiner—Douglas D. Watts
Attorney, Agent, or Firm—John Joseph Hall

[57] ABSTRACT

An improved cake cutter device of the type having a cutting blade removably attached to a gear housing with rack and pinion means in conjunction with a plate to determine the length, and a helical screw in conjunction with the cutting blade to determine the width of a piece of cake to be cut, and securing means to secure the cut portion of the cake in position with the cutting blade, the improvement comprising a handle mounted perpendicularly to the plane of the housing of the cake cutter and trigger means for moving the rack means, a platform member to support the cake cutter to prevent touching of the cutting blade with the surrounding premises, and a V-shaped cutting blade with a curved apex.

3 Claims, 11 Drawing Figures

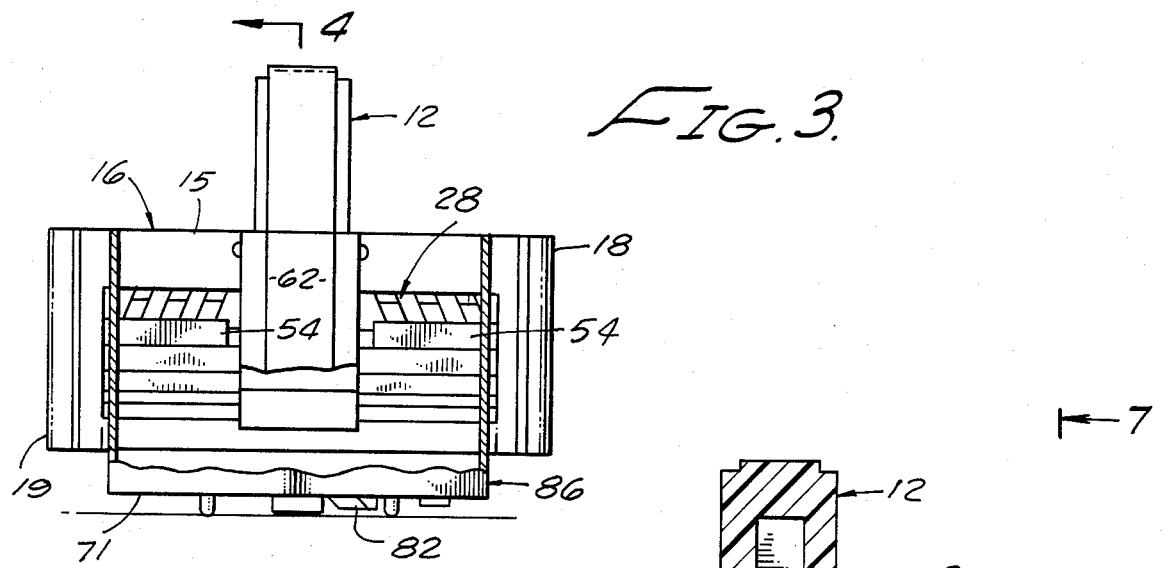
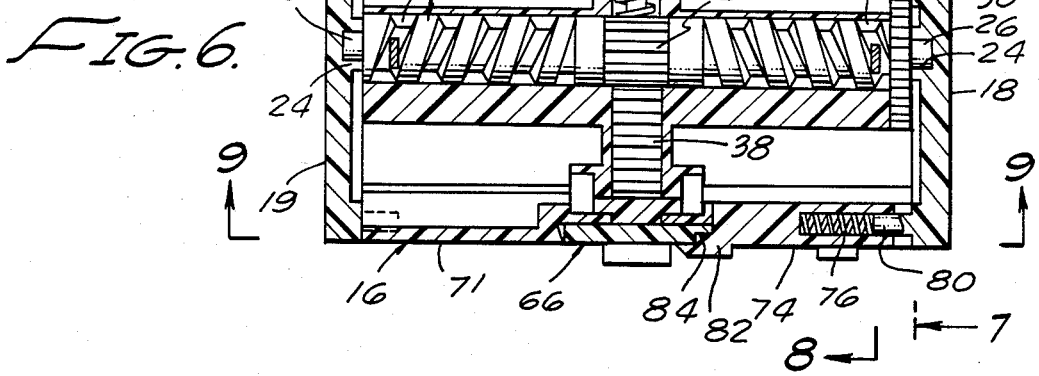
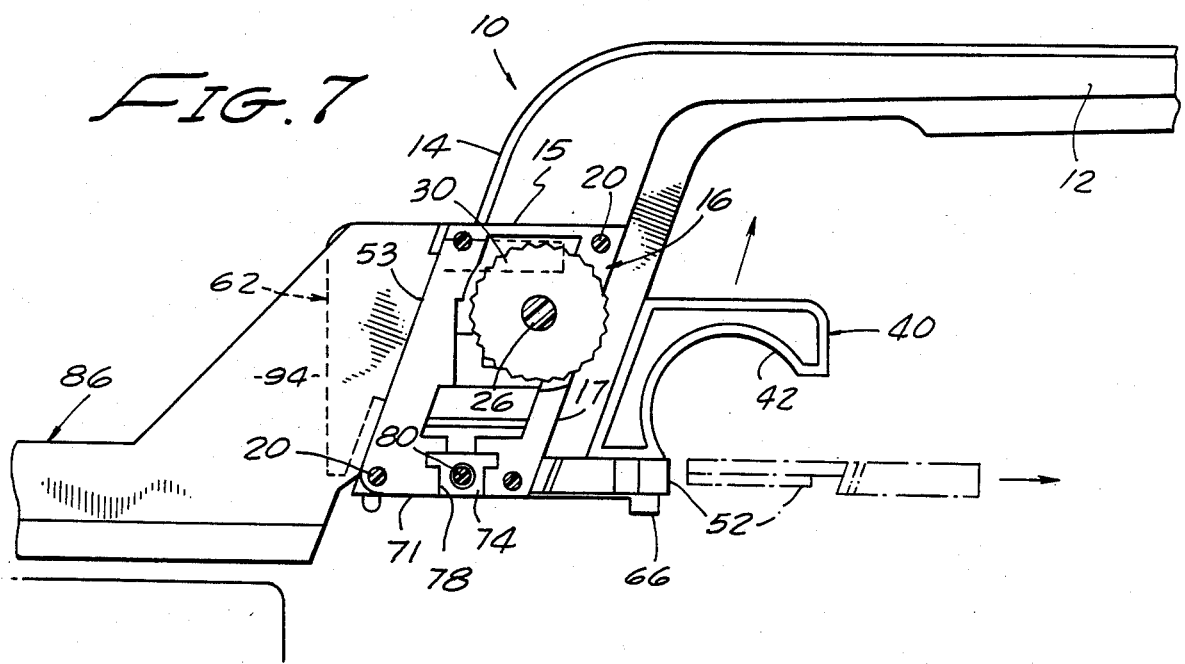

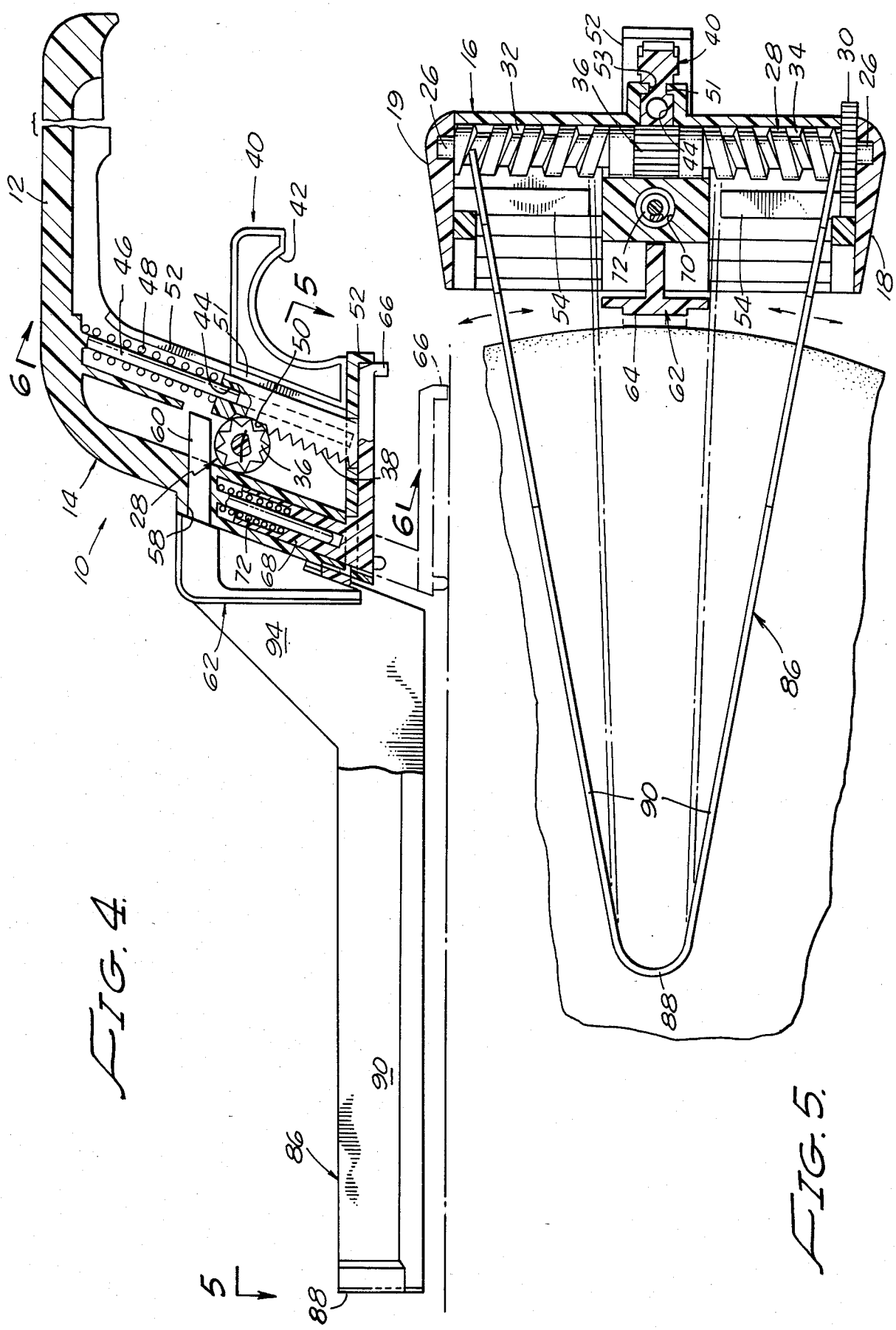

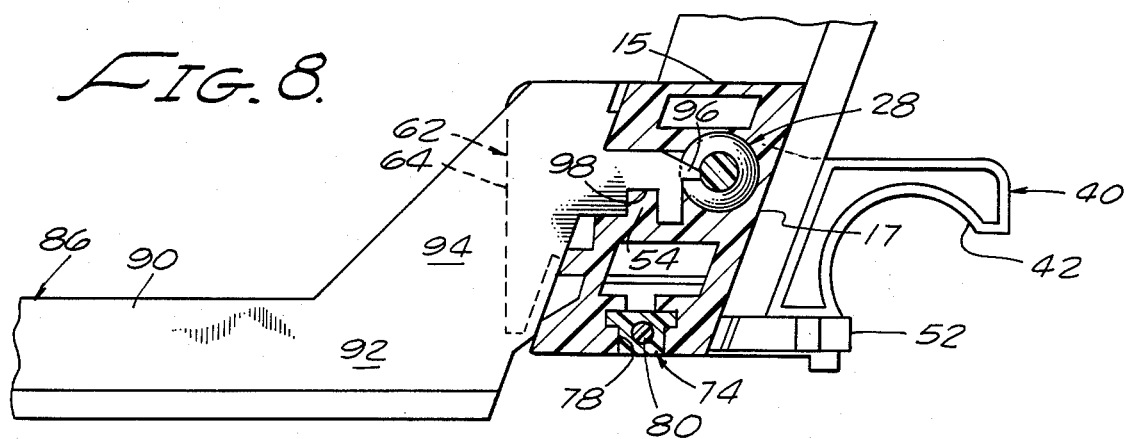
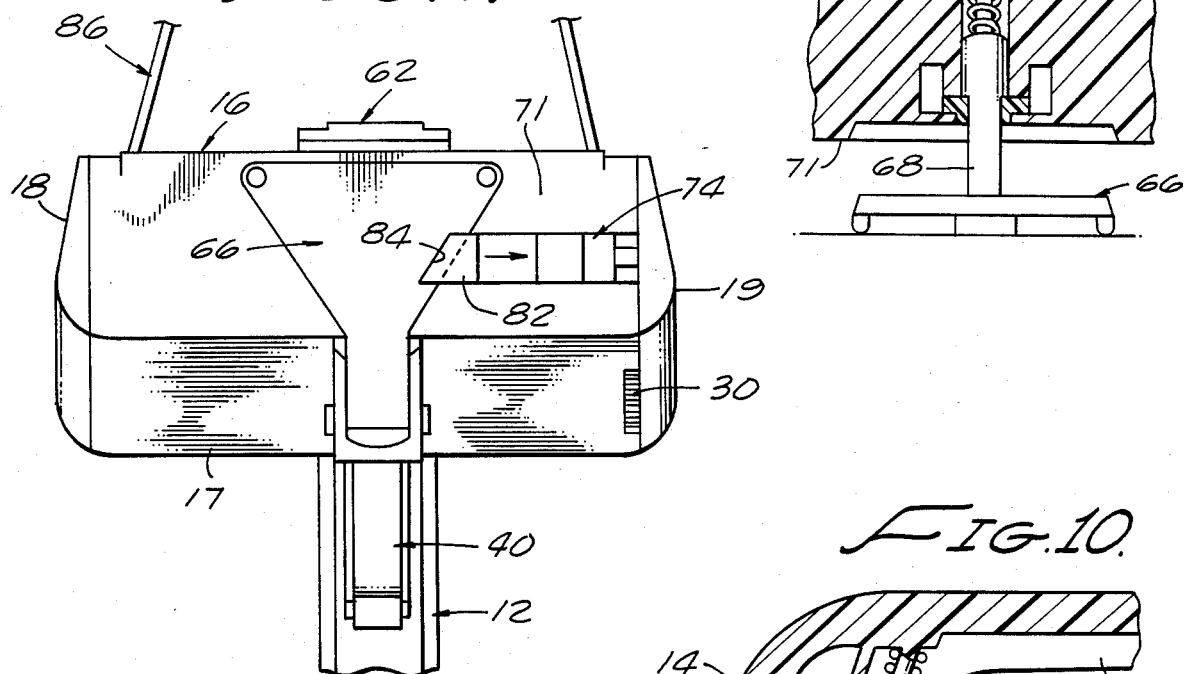
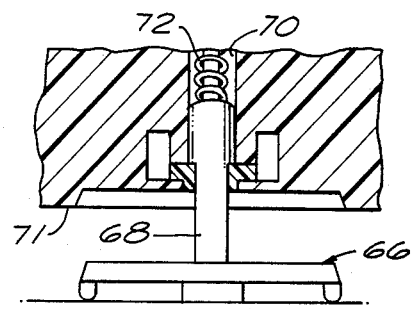
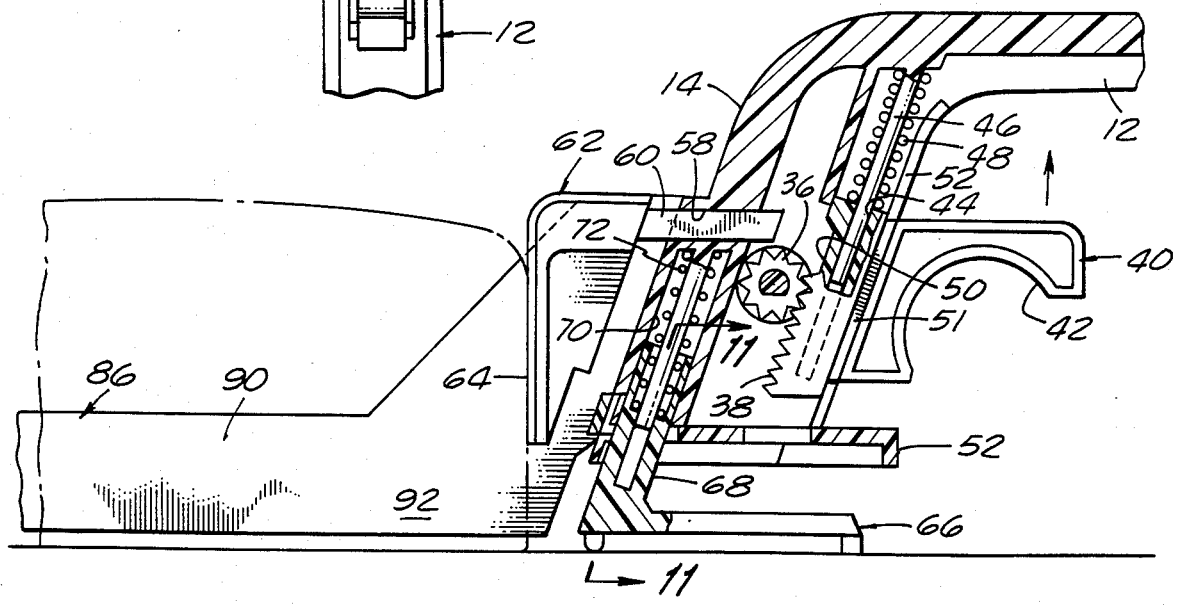

CAKE CUTTER WITH AN ADJUSTABLE BLADE

SUMMARY OF INVENTION

This invention relates to an improved cake cutting device over my original invention described and claimed in U. S. Pat. No. 4,411,066, issued on Oct. 25, 1983, and the prior art disclosed therein.

The cake cutter device of said patent requires the use of two hands of an operator, one hand to hold the device and the other hand to push the cake cutter down vertically into the cake to complete the cut. The required use of both hands of the operator also results in a slower production of cut pieces of cake.

The present invention has an improved handle member, extending longitudinally and perpendicularly to the plane of the housing of the cake cutter, which permits cutting of the desired piece of cake with one hand of the operator.

Further, the present invention provides a trigger member which produces a secure holding of the cut piece of cake and which can easily be operated by a finger of the same hand that is holding the cake cutter while cutting the cake. With these improvements, the present invention facilitates the cutting of cakes and increases substantially the rate of production of cut pieces of cake.

The present invention also provides a platform member for supporting the cake cutter on a level surface in a horizontal position without the cutting blade of the cake cutter touching the surface, thereby preventing possible damage to the blade and maintaining sanitary conditions of the cake cutter.

I have found that a V-shaped cutting blade with a curved apex and made of stainless steel, provides optimum cutting action and durability of the blade.

It is, therefore, an object of this invention to provide an improved cake cutting device which requires only one hand of an operator to cut pieces of cake.

Another object of this invention is to provide an improved cake cutting device having a trigger member for providing security of the cut piece of cake by use of the same hand that is holding the cake cutter.

A further object of this invention is to provide an improved cake cutting device which has a platform member to keep the cake cutting device in a horizontal position and to prevent the cutting blade of the cake cutter from touching undesired surfaces, thereby preventing possible damage to the blade and preserving its sanitary condition.

A yet further object of this invention is to provide an improved V-shaped cutting blade for a cake cutting device with a curved apex.

These and other objects will be more readily understood by reference to the following description and accompanying drawings, in which FIG. 1 is a perspective view of a preferred embodiment of the invention illustrating the cake cutter in the process of cutting cake.

FIG. 2 an exploded perspective view illustrating components of a preferred embodiment of the invention.

FIG. 3 is a front elevational view of a preferred embodiment of the invention.

FIG. 4 is a vertical cross section taken on line 4—4 of FIG. 3.

FIG. 5 is a horizontal cross section taken on line 5—5 of FIG. 4.

FIG. 6 is a vertical cross section taken on line 6—6 of FIG. 4.

FIG. 7 is a vertical cross section taken on line 7—7 of FIG. 6.

FIG. 8 is a vertical cross section taken on line 8—8 of FIG. 6.

FIG. 9 is a fragmentary bottom plan view taken on line 9—9 of FIG. 6.

FIG. 10 is a fragmentary view similar to FIG. 4 illustrating the operation of a preferred embodiment of the invention.

FIG. 11 is a fragmentary view taken on line 11—11 of FIG. 10.

Figure 1:
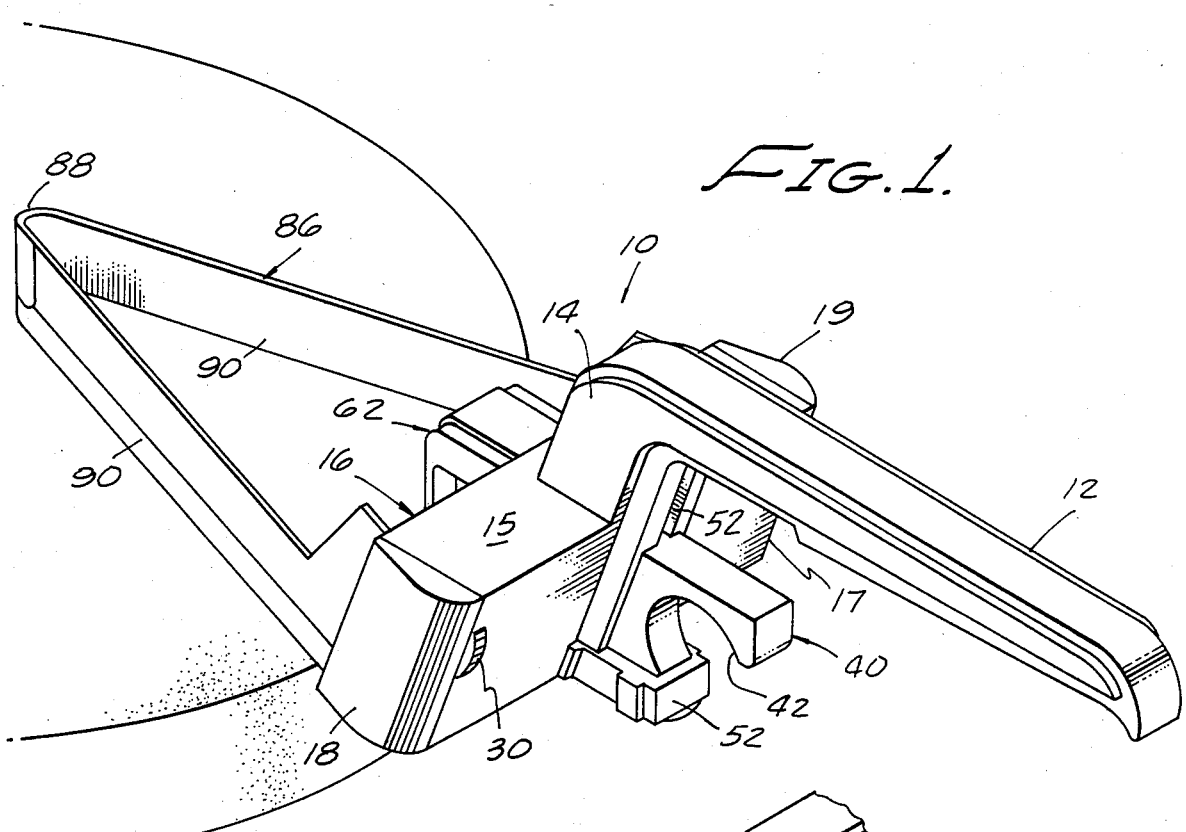
Figure 2:
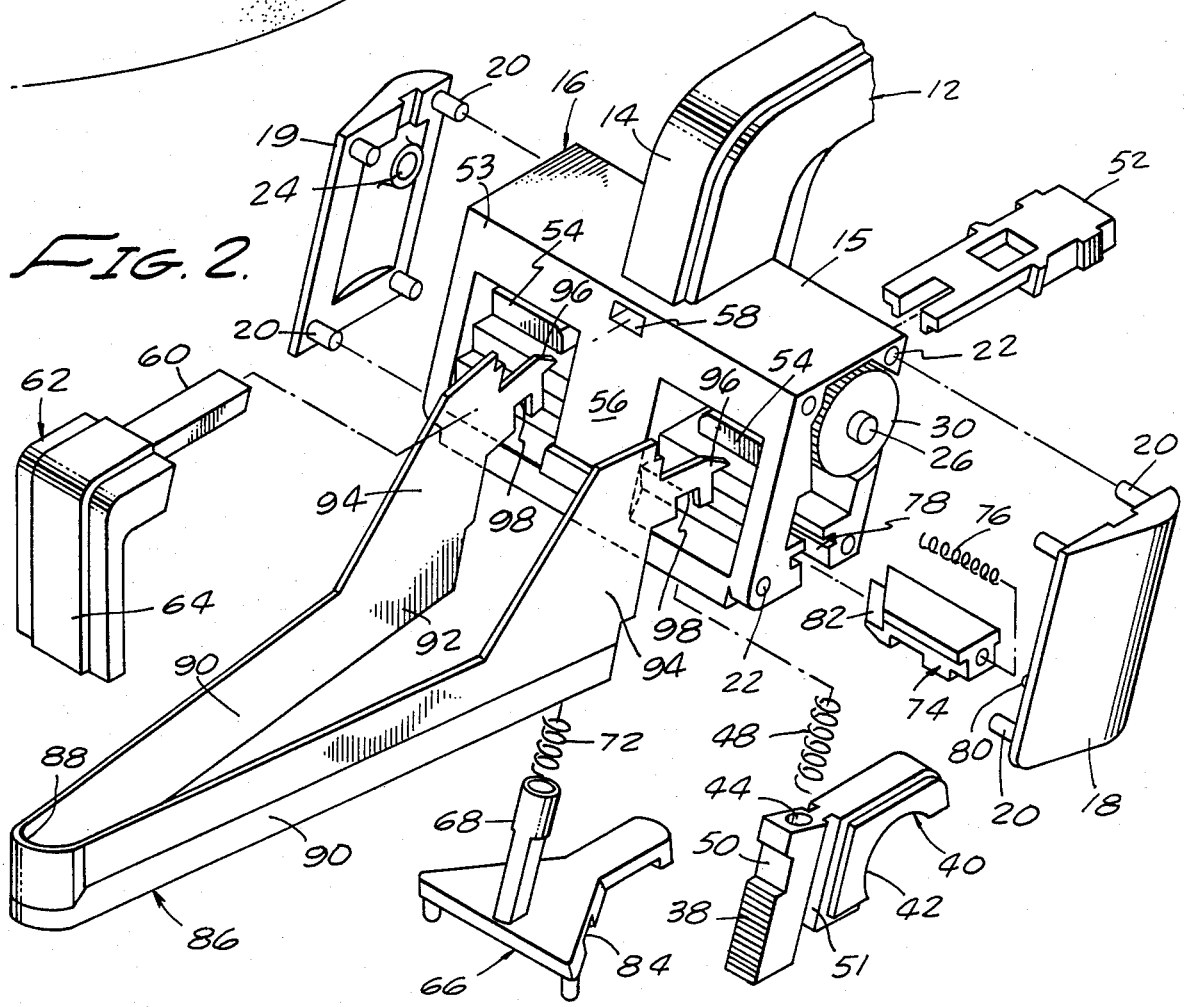

The cake cutter 10 has a longitudinal handle 12 which has a curved inner end 14 integrally formed in and at the top wall 15 of housing 16. Handle 12 is positioned in a perpendicular location with respect to housing 16.

Housing 16 has a rear wall 17 and is provided with left of center and right of center side wall plates 18 and 19, respectively, that are removably attached by integrally formed pin members 20 received by recesses 22 of housing 16.

Side wall plates 18 and 19 each have an inside wall bearing 24 which receives pin 26 of helical lead screw 28. Helical lead screw 28 is journaled perpendicularly to the plane of handle 12 into side wall plates 18 and 19 by pin 26. Helical lead screw 28 is provided at one end with a width regulating wheel 30.

Helical lead screw 28 is formed in two pieces, each having vertical grooves milled into each piece. One piece has vertical grooves milled with helical pitches 32 to the right of center and the other piece has helical pitches 34 to the left of center.

The center of helical lead screw 28 is provided with a pinion 36 which cooperates with the rack portion 38 of trigger 40.

Trigger 40 has a finger lever 42 extending outwardly in the same plane as handle 12. The rack portion 38 of trigger 40 has a longitudinal bore 44 which receives stem rod 46. Spring 48 is positioned around stem rod 46 and between the top of rack portion 38 of trigger 40 and the bottom surface of handle 12.

A notch 50 is formed in the upper front portion of rack portion 38 of trigger 40.

Trigger 40 has longitudinal grooves 51 in its center portion which fit in a longitudinal slot 53 formed in the rear wall 17 of housing 16.

The bottom outer portion of trigger 40 rests on a stop member 52 integrally formed from the rear wall 17 of housing 16.

The front wall 53 of housing 16 has a plurality of ledges or steps 54 ascending step-wise from the bottom of housing 16 towards its top on each side of a flat inclined center portion 56 of the front wall 53 of housing 16. Center portion 56 of housing 16 has an oblong shaped opening 58 extending housing 16 to receive the guide bar portion 60 integrally formed from length limiting member 62. The front portion 64 of length limiting member 62 is integrally formed at a right angle to the guide bar portion 60 of length limiting member 62.

A platform member 66 has an upwardly projecting rod member 68 integrally formed from the front top portion of platform member 66, which rod member 68 extends into an opening 70 extending into the housing 16 from its bottom wall 71. Platform spring 72 is inserted between the top of platform rod member 68 and the top of opening 70.

The bottom wall 71 of housing 12 is shaped to receive platform 66 when the platform 66 is pushed upwardly. A keeper member 74 actuated by keeper spring 76 maintains platform member 66 in its upward position in place against the bottom wall 71 of housing 16. Keeper member 74 is received in groove 78 at the left side of housing 16 and is maintained in place by a pin 80 of left side plate 18 bearing against spring 76.

A flange 82 integrally formed at the inner end of keeper 74 fits in a corresponding groove 84 of platform 66 to maintain the platform 66 in position against the bottom wall 71 of housing 16.

Cake cutting blade 86 is V-shaped with a curved apex 88 and longitudinal cutting sides 90. The inner end 92 of longitudinal cutting sides 90 are each formed into a flange 94 having a projection tip 96 which rides on the helixes of lead screw 28, and also has a notch 98 fitting on the top ledges 54 of housing 16.

In operation, the improved cake cutter 10 with cutting blade 86 in position is supported by platform member 66 in its extended position on a relatively flat surface.

An operator wishing to cut a piece of cake in a predetermined size first rotates width wheel 30, which turns lead screw 28, thereby moving cutting sides 90 of cutting blade 86 towards each other or apart, as desired.

Then, the operator adjusts the portion of length limiting member 62 to the desired length of the piece of cake to be cut by pushing it in or away from the front wall 53 of housing 16.

Next, the operator, using one hand only, grasps handle 12 and brings the cake cutter 10 over the cake to be cut and pushes the cutting blade 86 of cake cutter 10 down into cake, vertically, thereby cutting the piece of cake desired.

Thereafter, the operator pulls trigger 40 up with one finger of the same hand that is holding the cake cutter 10, thereby causing lead screw 28 to rotate due the action of rack portion 38, which results in bringing cutting sides 90 of cutting blade 86 towards each other and securely holding the cut piece of cake.

The operator then lifts the cake cutter 10 up and away from the cake and deposits the cut piece of cake where desired and releases the cut piece of cake by letting go of the trigger 40, which returns to its original position through the action of spring 48.

The cake cutter 10 is then ready to cut another piece of cake as desired.

Although I have described my invention in detail with reference to the accompanying drawings illustrating a preferred embodiment of my invention, it is understood that numerous changes in the details of construction and arrangement of parts may be made without departing from the spirit and scope of the invention as hereinafter claimed.

I claim:

1. In a cake cutter of the type having a housing, a helical screw membr having one side with helixes diverging to the right of center and the other side with helixes diverging to the left of center, and journaled into the housing, a pinion mounted on said helical screw member, a cutting blade having longitudinal sides with ends riding on said helixes, a length limiting plate located in front of said housing, and rack means for moving said longitudinal sides together in conjunction with said pinion and helical screw, the improvement which comprises:

(a) handle means including an inner handle end mounted perpendicularly to the plane of said housing and extending upwardly therefrom, said inner handle end having a slot therein;

(b) trigger means operably connected with said rack means and slidably mounted in said slot; whereby only one hand of an operator is needed to cut and securely remove a piece of cake.

2. A cake cutter according to claim 1 in which a platform member is movably attached to the bottom wall of said housing to support said cake cutter horizontally to prevent undesired touching of said cutting blade with the surrounding premises.

3. A cake cutter according to claim 1 in which the cutting blade is V-shaped with a curved apex.

* * * * *